United States Patent [19]

Garces

[11] Patent Number: 4,902,442
[45] Date of Patent: Feb. 20, 1990

[54] STABILIZED MIXTURES OF COLLOIDAL SILICA AND SOLUBLE SILICATE AND A METHOD OF PRODUCING POROUS SILICA COMPOSITIONS THEREFROM

[75] Inventor: Juan M. Garces, Midland, Mich.

[73] Assignee: The Dow Chemical Company, Midland, Mich.

[21] Appl. No.: 261,431

[22] Filed: Oct. 24, 1988

[51] Int. Cl.$^4$ .......................... C07F 7/02; C04B 35/14; C09K 3/00

[52] U.S. Cl. .................................. 252/313.2; 252/380; 252/389.31; 252/389.32; 264/42; 264/DIG. 19

[58] Field of Search ................ 252/313.2, 380, 389.31, 252/389.32; 264/432, DIG. 19

[56] References Cited

U.S. PATENT DOCUMENTS

| | | | |
|---|---|---|---|
| 3,678,144 | 7/1972 | Shoup | 264/42 |
| 3,975,248 | 8/1976 | Gorman | 204/157.1 |
| 4,094,690 | 6/1978 | Morton | 264/DIG. 19 |
| 4,112,032 | 9/1978 | Blaszyk et al. | 264/42 |
| 4,344,860 | 8/1982 | Plueddemann | 252/389 |
| 4,370,255 | 1/1983 | Plueddemann | 252/389 |
| 4,548,733 | 10/1985 | Vincent | 252/313.1 |

Primary Examiner—Mary C. Lee
Assistant Examiner—Catherine S. Kilby Scalzo

[57] ABSTRACT

A prereaction mixture which is useful in the preparation of porous silica compositions with uniform pore sizes. The porous silica composition comprises a substituted nitrogen-containing siliconate, a colloidal silica and a soluble alkali silicate. By the addition of the substituted nitrogen containing siliconate to either the colloidal silica or soluble silicate, or by combining all three ingredients, a stable solution results, thereby avoiding the premature polymerization of the colloidal silica upon the addition of the soluble silicate. The soluble alkali silicate can have a metal cation which is selected from the group consisting of potassium and sodium.

8 Claims, No Drawings

STABILIZED MIXTURES OF COLLOIDAL SILICA AND SOLUBLE SILICATE AND A METHOD OF PRODUCING POROUS SILICA COMPOSITIONS THEREFROM

BACKGROUND OF THE INVENTION

The present invention relates to a composition and a method of preparing porous silica compositions with uniform and controlled pore sizes.

In the past, there have been difficulties in making silica bodies which are porous and uniform in size. One technique used in the industry is to incorporate certain metal oxides within a silica network. Typically an aqueous solution is prepared from silica solutions, as alkali metal silicates, quaternary ammonium silicate, colloidal silica, and mixtures thereof. A metal oxide is then added to the silicate solution and an organic gelating agent is added to cause polymerization of the silica to a coherent and porous body. The metal oxide becomes part of the silica network. Although porous silica bodies are obtained by this preparative technique, the size of the pores throughout the bodies are not uniform. Thus, the technique is not very desirable.

There are techniques practiced in the art which do produce porous silica compositions that have uniform pore sizes, but the techniques are limited by such variables as ratio of alkali metal silicate to colloidal silica solutions, the concentration of silica, the amount of dispersion employed and the like. Other difficulties with the techniques practiced in the art are obtaining acceptable pore size distributions of the polymers and controlling polymerization. One technique in the art is to prepare porous bodies from solutions containing a soluble alkali metal silicate, a potassium silicate, colloidal silica and a gelating agent.

A severe limitation in using this technique is that the spheres can only be successfully made from potassium silicates. Potassium silicates are expensive and are not readily available. When sodium silicates are used with the colloidal silicates, the solution immediately gels. The principle problem is that the colloidal silica and the sodium silicate are incompatible when admixed together. Thus, due to the immediate gelling of the solution, acceptable polymerizing of uniform spheres from sodium silicates is not possible.

Thus, it would be desirable to have more flexibility in the concentrations, types of silicate used and to be able to produce silica bodies with uniform pore diameter distribution. A method of preparing a porous silica composition from a sodium silica/-colloidal silica combination would be desirable, since sodium silicates are inexpensive and are readily available.

SUMMARY OF INVENTION

The present invention is a prereaction mixture useful in the preparation of porous silica compositions with uniform pore sizes. The porous silica composition comprises a substituted nitrogen-containing siliconate and aqueous colloidal silica or soluble silicate. Surprisingly, it has now been discovered that the addition of a substituted nitrogen-containing siliconate to the colloidal silica solution stabilizes the solution, thereby avoiding the premature polymerization of the silicate upon the subsequent addition of a soluble silicate. Similarly, the substituted nitrogen-containing siliconate can be added to a solution of soluble silicate. The substituted nitrogen-containing siliconate also stabilizes the solution so that upon the subsequent addition of colloidal silica, premature polymerization is avoided.

The prereaction mixture can be made by slowly combining the colloidal silicate, substituted nitrogen-containing siliconate, soluble silicate and gelating agent.

In a different aspect, the present invention is a method useful in preparing a porous silica composition with uniform pore sizes by the addition of a substituted nitrogen-containing siliconate to either a solution of colloidal silica or soluble silicate, or by combining all the ingredients together, e.g., substituted nitrogen-containing siliconate, colloidal silica, soluble silicate. In the practice of the present method, a substituted nitrogen-containing siliconate is added to one or both, i.e., to at least one, of the colloidal silica and soluble silicate solutions prior to their mixing. A gelating agent is then added to the resulting mixture. Alternatively, the gelating agent can be added to either one or both of the stabilized colloidal silica or stabilized soluble silicate solutions prior to their mixing. The mixture can then be polymerized by heating it at a temperature and for a time sufficient to produce a polymerized porous silica material with the desired uniform pore characteristics.

Mixtures of colloidal silica and soluble silicates in the presence of substituted nitrogen-containing siliconates are stable, thereby avoiding premature polymerization of silicate, and ease the handling of the mixtures. Moreover, the artisan has greater flexibility in making the porous silica bodies. In particular, the artisan can now use the less expensive sodium silicate instead of the potassium silicate, if it is so desired. By the stabilization of soluble silicate and colloidal silica solutions with substituted nitrogen-containing siliconates one can desirably create porous silica compositions with uniform pore sizes from solutions that proved ineffective prior to this invention.

The stabilizing mixtures of colloidal silica and soluble silicate can be employed in many different applications and serve as intermediates for the synthesis of a number of porous bodies. The porous bodies can be used as catalyst supports, filters, membranes, aerators, thermal insulators, enzyme supports, chromatographic separators, gas filters, sound proofing, carriers, controlled drug delivery and fire proof bodies.

DETAILED DESCRIPTION OF THE INVENTION

It has been discovered that porous silica materials with uniform and controlled pore sizes can be obtained by polymerization of homogenous solutions of substituted nitrogen-containing siliconate, colloidal silica, soluble silicate and a gelating agent.

Surprisingly, it was discovered that the addition of a substituted nitrogen-containing siliconate to colloidal silica results in a colloidal silica solution which is stable and does not prematurely polymerize silicate upon the subsequent addition of a soluble silicate. Similarly, the addition of a substituted nitrogen-containing siliconate to soluble silicate results in a solution which is stabilized against the premature polymerization of silicate upon the subsequent addition of colloidal silica. If desired, the substituted nitrogen-containing siliconate can be added to both the soluble silicate and colloidal silica solutions prior to their mixing to produce a solution which is stabilized against the premature polymerization of silicate.

The soluble silicate suitable in the present invention is an alkali silicate. The alkali silicate can be selected from the group consisting of lithium, potassium, sodium, and tetraorganoammonium cations. More preferably the soluble silicate is potassium silicate or sodium silicate, and most preferably sodium silicate. Examples of commercially available sodium silicate solutions include the liquid sodium silicates marketed by the PQ Corporation, Valley Forge, Pa. 19482 or by other vendors and typically contain from about 24 to about 36 weight percent $SiO_2$ and have a $SiO_2/Na_2O$ molar ratio from about 2 to about 4, the remainder comprising water.

The aqueous colloidal silica solutions are commonly available commercially by many companies, e.g. E. I. DuPont de Nemours and Company, Wilmington, Del. 19898 under the trade name Ludox®. The colloidal silica solutions contain from about 15 to about 60 weight percent $SiO_2$ dispersed in aqueous solution.

The substituted nitrogen containing siliconates are of the following general formula:

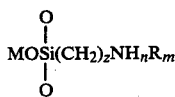

wherein M is selected from the group consisting of: (a) alkali metal cations, and (b) tetraorganoammonium cations; z has a value of 2 or 3; n has a value of zero or 1; m has a value of 1 or 2; the sum of n+m is 2; and each R is selected independently from the group consisting of: $-CH_2COOM$, $-CH_2CH_2COOM$, $-(CH_2)_zN(CH_2COOM)_2$,

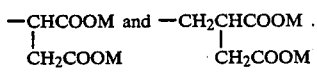

Preferably, the alkali metal cation, M, is potassium or sodium. More preferably, the substituted nitrogen containing siliconate is of the following formula:

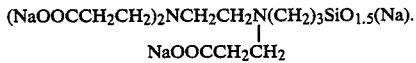

Suitable gelling agents used in the present invention are those that can reduce the pH of an alkaline solution or induce the polymerization of silicate solutions. Generally, the gelling agents can include formaldehyde, paraformaldehyde, formamide, methylformate, ethylformate, methyloxalate, methylacetate and ethylacetate.

The porous silica compositions are made via polymerization of an aqueous mixture of the components. This process includes the addition of the substituted nitrogen containing siliconate to either the colloidal silica or aqueous silicate prior to their mixing. The substituted nitrogen-containing siliconate also can be preblended with both the colloidal silica and soluble silicate prior to their mixing. It is preferably desirable to blend the two solutions slowly, thereby ensuring the prevention of premature polymerization of silicate.

There are several ways of combining the components to form an aqueous mixture which will be stable and will not prematurely polymerize. One way of combining the components is to first admix the substituted nitrogen-containing siliconate and colloidal silica, then add the soluble silicate to the solution. Another aqueous mixture of the invention is to admix the substituted nitrogen-containing siliconate and the soluble silicate, then add the colloidal silica to the solution. Still another aqueous mixture of the invention is to admix all three components together simultaneously. Furthermore, the gelating agent can be added at any point to the solution.

These solutions are stable and do not prematurely polymerize upon the subsequent addition of the colloidal silica or soluble silicate. Preferably the substituted nitrogen-containing siliconate is preblended to the colloidal silica. Admixing by the prescribed combinations results in a stabilized mixture from which porous silica composition with controlled pore size distributions may be obtained.

The stabilized solution resulting from the process of this invention typically comprises from greater than zero to about 10 weight percent substituted nitrogen-containing siliconate, about 90 to about 100 weight percent combined colloidal silica and soluble silicate. The weight ratio of the colloidal silica and soluble silicate is an individualized choice and is only limited by the parameter of being about 90 to about 100 percent of the composition comprising the three components, e.g. substituted nitrogen-containing siliconate, colloidal silica, and soluble silicate. A gelating agent is added to the composition and is about 1 to about 25 weight percent of the composition. More preferably, from about 0.5 to about 5 weight percent substituted nitrogen-containing siliconate, about 95 to about 99.5 weight percent combined colloidal silica and soluble silicate, and from about 1 to about 10 weight percent of the composition being the gelating agent. Most preferably, from about 1 to about 2 weight percent substituted nitrogen-containing siliconate, from about 98 to about 99 weight percent combined colloidal silica, and from about 2 to about 10 weight percent of the composition being the gelating agent.

The mixture of colloidal silica, soluble silicate, substituted nitrogen-containing siliconate and gelating agent is polymerized by heating at a temperature, usually below the boiling point of the mixture, selected to yield a homogenous porous material. Typically the temperature is about 50° C. to about 90° C. The polymerization reaction should be carried out at appropriate ratios and for a period of time sufficient to produce a porous body with desired characteristics, i.e., porosity, pore size, mechanical strength, and the like. Such conditions are taught in U.S. Pat. No. 4,112,032 and are incorporated herein by reference. Other polymerization techniques known or used in the art can also be acceptably employed herein. Upon polymerization of the mixture of colloidal silica, soluble silicate, substituted nitrogen-containing siliconate, and gelating agent, one obtains a solid with very smooth appearance. After the solid is washed and dried, one obtains a porous silica body, with porosity ranging from about 30 to about 90 percent, and containing pore sizes ranging from about 50 to about 5000 angstroms with uniform pore diameter distributions. More preferably, the silica bodies have a porosity from about 30 to about 90 percent, and a size range from about 50 to about 3,000 angstroms. The pore size is very uniform or the distributions are generally of a very narrow range.

Organic moieties incorporated within the porous material during synthesis or washing can be removed by thermal or hydrothermal treatment of the freshly polymerized pristine porous silica material. For example, the resulting porous material can be washed with polar solvents to remove the reaction products remaining within the pores of the silica structure. Such polar solvents could include methanol, ethanol, acetone, water and the like. Combinations of acid or aqueous buffers can be used to remove soluble alkalinity. Various polar solvents, such as a substantially anhydrous alcohol or ketone, such as acetone, can be used as drying agents to prevent cracking of the porous body upon drying. Drying can be accomplished by heating in air to remove solvents from the pore system. Usually 150° C. is sufficient to yield a dry porous body, although other means of drying can be used. Furthermore, to ensure that all organic matter, including the substituted nitrogen-containing siliconate, is removed from the pore system, the porous bodies can be heated in an oxidizing atmosphere such as air, at temperatures sufficiently high to ensure complete combustion of the organic matter, e.g. usually 550° C. in air is sufficient. Generally, the temperature range for heating the porous bodies in an oxidizing atmosphere is about 400° C. to about 600° C.

EXAMPLES

The following example is given to illustrate the present invention and is not to be construed as limiting the scope thereof in any manner.

Solution A was made by mixing 20 grams of an aminecarboxylic siliconate whose formula is as follows: with 15 grams of water. Solution B was made by mixing 108.63 grams of colloidal silica (Ludox® AS-40 by DuPont) with 5 grams of solution A. Solution C was $$(NaOOCCH_2CH_2)_2NCH_2CH_2N(CH_2)_3SiO_{1.5}(Na)$$
$$|$$
$$NaOOCCH_2CH_2$$

made by mixing 100.23 grams of sodium silicate (N type by PQ Corporation) with 5.94 grams of solution A. Solutions B and C were allowed to sit overnight.

Formamide was added to solution B, and the resulting mixture was added to solution C. The final mixture, D, contained 10 percent by volume formamide. On heating mixture D to 70° C. it polymerized within minutes producing a white, smooth solid mass.

The solid was first washed with acetone and then with 1M HCl and finally with water. It was dried at 200° C. and the dry product was used to do a mercury porosimetry analysis. The sharp adsorption isotherm and the pore diameter distribution showed that uniformly small-sized pores were obtained averaging about 900 angstroms.

What is claimed is:

1. In a method of preparing a porous silica composition with uniform pore size, wherein aqueous colloidal silica is blended with a soluble silicate and a gelating agent and the blend is subsequently polymerized to produce the porous silica composition, the improvement which comprises preblending at least one of the aqueous collodial silica solution and the soluble alkali silicate solution with an effective stabilizing amount of a substituted nitrogen-containing siliconate whereby the blend is stabilized against premature polymerization of silicate.

2. The improvement of claim 1, wherein the substituted nitrogen-containing siliconate has the general formula:

$$\begin{array}{c} O \\ | \\ MOSi(CH_2)_zNH_nR_m \\ | \\ O \end{array}$$

wherein
M is selected from the group consisting of:
(a) alkali metal cations, and
(b) tetraorganoammonium cations,
z has a value of 2 or 3,
n has a value of zero or 1,
m has a value of 1 or 2, the sum of n+m is 2, wherein M is defined above, and
R is selected from the group consisting of:

$$-CH_2COOM, -CH_2CH_2COOM, -(CH_2)_zN(CH_2COOM)_2,$$

$$\begin{array}{cc} -CHCOOM & \text{and} -CH_2CHCOOM. \\ | & | \\ CH_2COOM & CH_2COOM \end{array}$$

3. The improvement of claim 2, wherein the alkali metal cation M is selected from the group consisting of potassium and sodium.

4. The improvement of claim 3, wherein the substituted nitrogen-containing siliconate is of the formula:

$$(NaOOCCH_2CH_2)_2NCH_2CH_2N(CH_2)_3SiO_{1.5}(Na).$$
$$|$$
$$NaOOCCH_2CH_2$$

5. The improvement of claim 1, wherein the soluble alkali silicate is selected from the group consisting of lithium potassium, sodium and tetraorganoammonium cations.

6. The improvement of claim 1, wherein the gelating agent is selected from the group comprising formaldehyde, paraformaldehyde, formamide, methylformate, ethylformate, methyloxalate, methylacetate and ethylacetate.

7. The improvement of claim 1, wherein both the aqueous colloidal silica and soluble silicate are preblended with a substituted nitrogen-containing siliconate prior to their blending.

8. The improvement of claim 1, wherein the silica composition has a pore size within the range of from about 50 to about 5,000 angstroms and a porosity ranging from about 30 to about 90 percent.

* * * * *